United States Patent
Laakso

[15] 3,697,626
[45] Oct. 10, 1972

[54] N-PHOSPHORYLAMINOETHYL PHOSPHATE

[72] Inventor: Perttu V. Laakso, Barrington, Ill.

[73] Assignee: The Kendall Company, Boston, Mass.

[22] Filed: Aug. 15, 1969

[21] Appl. No.: 850,636

[52] U.S. Cl. .................................. 260/926, 424/204
[51] Int. Cl. .............................. C07f 9/08, C07f 9/22
[58] Field of Search .......................... 260/502.5, 926

[56] References Cited

UNITED STATES PATENTS

| | | |
|---|---|---|
| 3,098,072 | 7/1963 | Cherbuliez et al. ......... 260/247 |
| 3,151,137 | 9/1964 | Young et al. .............. 260/403 |
| 2,730,542 | 1/1956 | Ferrari et al. ........... 260/944 X |
| 3,517,087 | 6/1970 | Coleman ................... 260/926 |

FOREIGN PATENTS OR APPLICATIONS

| | | |
|---|---|---|
| 931,146 | 7/1963 | Great Britain............. 260/926 |
| 43/17,562 | 7/1967 | Japan ...................... 260/926 |

OTHER PUBLICATIONS

Hackh's Chemical Dictionary, McGraw-Hill, New York, Fourth Edition (1969) page 516.

*Primary Examiner*—Joseph Rebold
*Assistant Examiner*—Richard L. Raymond
*Attorney*—R. W. Furlong

[57] ABSTRACT

N-phosphorylaminoethyl phosphate is made from phosphoric acid and 2-aminoethanol. It is useful as a therapeutic agent for producing high absorption and retention of phosphate and calcium with extremely low renal calcinosis.

1 Claim, No Drawings

N-PHOSPHORYLAMINOETHYL PHOSPHATE

This invention relates to N-phosphorylaminoethyl phosphate and its use as a therapeutic agent for introducing phosphate into the bodies of warm-blooded animals.

There have been employed for introducing phosphate into the systems of warm-blooded animals in order to adjust the calcium-phosphorus ratio in a variety of phosphate compounds; dosing with these compounds has been employed for treatment of hypercalcemia and osteoporosis, inter alia, and has been described by Tisdall and Harris, Journal American Medical Association, Volume 19, 884–887 (1922); Goldsmith and Ingbar, Journal of Clinical Investigation, Volume 114, 1053 (1965); Cattaneo and Rocchietta, Minerva Medica, Volume 57, 3397–3405 (1966); and Nieper et al. Canadian Pat. No. 760,469.

All of the phosphate therapeutic agents hitherto tried have had various disadvantageous characteristics such as bad taste, or have produced unwanted side effects such as diarrhea, renal calcification, or increase in the sodium or potassium ionic level in the body to an undesirably great extent.

It has now been found that a new compound, N-phosphorylaminoethyl phosphate is useful as a therapeutic agent for producing both high absorption and high retention of phosphate (and calcium) together with extremely low renal calcinosis as shown by tests on rats. The compound is useful in oral dosage form in amounts from 0.360–0.036 g. daily, per kilogram of body weight approximately 0.072 g. per kg. being preferred and is effective with diets which are low in calcium as well as with those containing the normal amount of calcium. The compound is of relatively low toxicity, the $LD_{50}$ in mice being 1.95 g. per kilogram and that in rats being 1.5 g. per kilogram. It may be mixed with food or may be administered in capsule or tablet form. It can be tabletted with conventional tabletting materials such as starch; because of its hygroscopicity it is preferably stored in sealed containers.

The compound N-phosphorylaminoethyl phosphate has the structure:

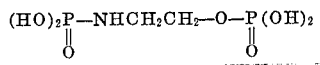

as verified by elemental analysis, infrared and nuclear magnetic resonance spectroscopy, and sodium hydroxide titer.

The following specific example is intended to illustrate more fully the nature of the present invention without serving as a limitation upon its scope.

EXAMPLE 1

There is placed in a three liter resin kettle fitted with a thermometer, dropping funnel, condenser, and magnetic stirrer 2080 g. of 85 percent phosphoric acid (18.10 moles). There is placed in the dropping funnel 553 g. of 2-aminoethanol (9.05 moles). The aminoethanol is allowed to flow into the kettle very slowly with continuous stirring, the rate of introduction being such that the temperature rises to about 80°–90° C. and remains within this range. After all of the 2-aminoethanol has been introduced, the kettle is connected to a vacuum pump and all of the free water is distilled off at 80° C. and 0.1 ml. of mercury pressure. At this point the residue in the kettle weighs 2329 g. The temperature of the reaction mixture is then raised gradually to 180°–190° C., and additional water is distilled off until a total of 632 g. has been collected. The residue in the flask weighing 2000 g. is a brown semisolid glassy material. Elemental analysis shows it to have the following composition: carbon 10.87 percent; hydrogen 4.27 percent; nitrogen 5.98 percent; phosphorus 27.85 percent. The material is stable when stored under anhydrous conditions, but it is hygroscopic and in water it hydrolyzes rapidly to a mixture of aminoethyl phosphate and phosphoric acid, the rate of hydrolysis at 100° C. being approximately 28 percent per hour at pH 0.8 and approximately 6 percent per hour at pH 7.2. In acid solution the aminoethyl phosphate which is one of the first stage products of the hydrolysis undergoes further hydrolysis to phosphoric acid and 2-aminoethanol at the rate of approximately 2 percent per hour at 100° C. at pH 2.7. This further hydrolysis of aminoethyl phosphate does not occur in alkaline solution.

N-phosphorylaminoethyl phosphate is miscible with water in all proportions but is insoluble in non-polar solvents as well as in such common organic solvents as alcohols, acetone, and ether glycols. An aqueous solution at 1 percent concentration has a pH of 1.9.

The infrared spectrum of the compound contains the following main peaks (in cm.$^{-1}$ determined by attenuated total reflection method) 2900, 2300, 2200, 2050, 1850, 1690, 1610, 1510, 1460, 1320, 1150, 1060, 860, and 800. The product gives a blue color with ninhydrin reagent. Assay by sodium hydroxide titration gives a purity of 100 percent (98–103 percent).

The nuclear magnetic resonance spectrum of the compound has the following principal peaks: 2.85, 3.33, 3.75, 4.30, and 5.05 ppm relative to 60 mc. at room temperature using deuterium oxide as solvent.

In order to determine the effectiveness of the new compound as a therapeutic agent, it was mixed in measured proportions with a low phosphorus rat food of the following composition:

| Ingredient | Percent by weight |
| --- | --- |
| Blood fibrin, bovine (washed 6 times) | 20.0 |
| Cod liver oil | 2.0 |
| Special salt mixture free of phosphorus | 7.0 |
| Sucrose | 60.0 |
| Hydrogenated vegetable oil | 10.0 |
| Vitamin diet fortification mixture | 1.0 |

Analysis of the foregoing diet showed it to contain 0.32 percent calcium and 0.04 percent phosphorus by weight. To it was added enough of the new compound to increase the phosphorus content to 0.95 percent. The diet containing the added compound was fed to a group of six rats for a period of 2 weeks, during which time the amount of daily food consumption of each rat was measured, and the amount of calcium and phosphorus in the feces and urine of each rat was determined. The absorption was determined by subtracting from the intake the amount excreted in feces. The retention was calculated by subtracting from the intake the total amount excreted in both feces and urine.

Using the above diet in which the per cent calcium is 0.32 and the per cent phosphorus is 0.95, giving a calcium:phosphorus ratio of 1:3.0, the per cent absorption for calcium and phosphorus respectively is 86.8 and 98.3, and the per cent retention is 85.2 and 63.3. After the feeding period, the rats were sacrificed and the calcium and phosphorus content of the kidney was determined both by chemical analysis and histologically by calculating the number of calcium chloranilate crystals in a cross-sectional area near the end of the kidney. Both procedures showed a calcinosis value less than half as great as that for other phosphate esters observed under similar conditions, including aminoethyl phosphate, and also less than half as great as that observed with sodium or potassium phosphate.

What is claimed is:

1. A compound having the following structure and composition

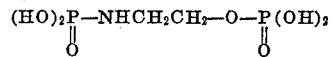

* * * * *